US012033605B2

(12) United States Patent
Lei et al.

(10) Patent No.: US 12,033,605 B2
(45) Date of Patent: Jul. 9, 2024

(54) RHYTHM POINT DETECTION METHOD AND APPARATUS AND ELECTRONIC DEVICE

(71) Applicant: NETEASE (HANGZHOU) NETWORK CO., LTD., Zhejiang (CN)

(72) Inventors: Jin Lei, Zhejiang (CN); Zhipeng Tan, Zhejiang (CN); Kang Chen, Zhejiang (CN); Weidong Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/274,184

(22) PCT Filed: Jul. 7, 2020

(86) PCT No.: PCT/CN2020/100701
§ 371 (c)(1),
(2) Date: Mar. 7, 2021

(87) PCT Pub. No.: WO2021/120602
PCT Pub. Date: Jun. 24, 2021

(65) Prior Publication Data
US 2022/0310051 A1 Sep. 29, 2022

(30) Foreign Application Priority Data
Dec. 20, 2019 (CN) ......................... 201911334455.6

(51) Int. Cl.
*G10H 1/40* (2006.01)
*G10H 1/00* (2006.01)

(52) U.S. Cl.
CPC ............. *G10H 1/40* (2013.01); *G10H 1/0008* (2013.01); *G10H 2210/071* (2013.01); *G10H 2210/076* (2013.01)

(58) Field of Classification Search
CPC .. G10H 1/40; G10H 1/0008; G10H 2210/071; G10H 2210/076
(Continued)

(56) References Cited

U.S. PATENT DOCUMENTS 5,606,144 A * 2/1997 Dabby .................. G10H 7/002 84/649
7,026,536 B2 * 4/2006 Lu ............................ G10H 1/40 84/612
(Continued)

FOREIGN PATENT DOCUMENTS

CN 1941071 A * 4/2007 ............. G10H 1/368
CN 101615302 A 12/2009
(Continued)

OTHER PUBLICATIONS

Yang Jie, Li Shuangtian,"An efficient algorithm of beat detecting and the implement on DSP", Signal Processing vol. 26. No.8, Aug. 31, 2010.
(Continued)

*Primary Examiner* — Christina M Schreiber
(74) *Attorney, Agent, or Firm* — Qinghong Xu

(57) ABSTRACT

The present disclosure provides a rhythm point detection method and apparatus and an electronic device, and relates to the technical field of music analysis. The method includes that: an audio signal to be detected is acquired, and an audio feature curve is generated according to the audio signal to be detected; a music style of the audio signal to be detected is determined; a detection peak threshold and a detection frame width threshold are determined according to the music style
(Continued)

of the audio signal to be detected; and a rhythm point of the audio feature curve is determined according to the detection peak threshold and the detection frame width threshold.

20 Claims, 4 Drawing Sheets

(58) Field of Classification Search
USPC ............................................................ 84/612
See application file for complete search history.

(56) References Cited

U.S. PATENT DOCUMENTS

| | | | | |
|---|---|---|---|---|
| 9,099,064 | B2 * | 8/2015 | Sheffer | G10H 1/0025 |
| 9,640,156 | B2 * | 5/2017 | Neuhauser | G10L 19/018 |
| 2005/0211071 | A1 * | 9/2005 | Lu | G10H 1/00 84/611 |
| 2007/0131096 | A1 * | 6/2007 | Lu | G10H 1/0008 84/611 |
| 2010/0204592 | A1 * | 8/2010 | Hatib | A61B 5/021 600/485 |
| 2016/0372096 | A1 * | 12/2016 | Lyske | G11B 27/28 |
| 2017/0287510 | A1 * | 10/2017 | Khanagha | G10L 25/18 |
| 2017/0358283 | A1 * | 12/2017 | Neuhauser | G10L 25/81 |
| 2018/0181730 | A1 * | 6/2018 | Lyske | H04L 63/10 |
| 2020/0335074 | A1 * | 10/2020 | Lou | G06F 16/683 |
| 2022/0047954 | A1 * | 2/2022 | Shi | A63F 13/54 |
| 2022/0310051 | A1 * | 9/2022 | Lei | G10H 1/0008 |

FOREIGN PATENT DOCUMENTS

| | | | | | |
|---|---|---|---|---|---|
| CN | 102116672 | A | | 7/2011 | |
| CN | 105513583 | A | | 4/2016 | |
| CN | 107103917 | A | | 8/2017 | |
| CN | 107682642 | A | * | 2/2018 | |
| CN | 107682642 | A | | 2/2018 | |
| CN | 107786416 | A | | 3/2018 | |
| CN | 108108457 | A | | 6/2018 | |
| CN | 108319657 | A | * | 7/2018 | G06F 16/632 |
| CN | 109658953 | A | | 4/2019 | |
| CN | 109670074 | A | | 4/2019 | |
| CN | 109670074 | A | * | 4/2019 | G10L 25/51 |
| CN | 110377786 | A | * | 10/2019 | |
| CN | 111128100 | A | | 5/2020 | |
| CN | 113223485 | A | * | 8/2021 | G10H 1/0008 |
| CN | 114238684 | A | * | 3/2022 | |
| WO | WO-2014096832 | A1 | * | 6/2014 | G10H 1/0008 |

OTHER PUBLICATIONS

T. FernandesTavares, J. Garcia Arnal Barbedo, R. Attux,"Unsupervised training of detection threshold for polyphonic musical note tracking based on event periodicity", ICASSP, Dec. 31, 2013.
Matthew Davies, MarkD. Plumbley, "Context-Dependent Beat Tracking of Musical Audio", IEEE Xplore, Apr. 30, 2007.
1st Office Action dated Sep. 29, 2020 of Chinese Application No. 201911334455.6.

* cited by examiner

RHYTHM POINT DETECTION METHOD AND APPARATUS AND ELECTRONIC DEVICE

CROSS-REFERENCE TO RELATED APPLICATIONS

The present disclosure claims priority to Chinese Patent Application No. 201911334455.6, filed on Dec. 20, 2019, and entitled "Rhythm Point Detection Method and Apparatus and Electronic Device". The entire contents of which are incorporated herein by reference.

TECHNICAL FIELD

The present disclosure relates to the technical field of music analysis, and in particular to a rhythm point detection method and apparatus and an electronic device.

BACKGROUND

At present, dance culture is developed towards diversified directions, and more and more people learn and arrange dances and provide an excellent dancing art for audiences. Along with the development of an Internet, driving a Three-Dimensional (3D) model through computer software to arrange a beautiful dance in the digital field is a hot spot at present.

SUMMARY

At least some embodiments of the present disclosure provide a rhythm point detection method and apparatus and an electronic device, so as at least to partially solve the above-mentioned technical problem.

In an embodiment of the present disclosure, a rhythm point detection method is provided, which includes that: an audio signal to be detected is acquired, and an audio feature curve is generated according to the audio signal to be detected; a music style of the audio signal to be detected is determined; a detection peak threshold and a detection frame width threshold are determined according to the music style of the audio signal to be detected; and a rhythm point of the audio feature curve is determined according to the detection peak threshold and the detection frame width threshold.

In another embodiment of the present disclosure, a rhythm point detection apparatus is further provided, which includes: an acquisition component, configured to acquire an audio signal to be detected and generate an audio feature curve according to the audio signal to be detected; a first determination component, configured to determine a music style of the audio signal to be detected; a second determination component, configured to determine a detection peak threshold and a detection frame width threshold according to the music style of the audio signal to be detected; and a third determination component, configured to determine a rhythm point of the audio feature curve according to the detection peak threshold and the detection frame width threshold.

In another embodiment of the present disclosure, an electronic device is further provided, which may include a memory, a processor and a computer program stored in the memory and capable of running in the processor, the processor executing the computer program to implement the rhythm point detection method mentioned above.

In another embodiment of the present disclosure, a computer-readable storage medium is further provided, in which a computer program is stored, the computer program being operated by a processor to execute the rhythm point detection method mentioned above.

BRIEF DESCRIPTION OF THE DRAWINGS

In order to describe the technical solutions in specific embodiments of the present disclosure or the related art more clearly, the drawings required to be used for descriptions about the specific embodiments or the conventional art will be simply introduced below. It is apparent that the drawings described below are some embodiments of the present disclosure. Those skilled in the art may further obtain other drawings according to these drawings without creative work.

DETAILED DESCRIPTION

Figure 1:
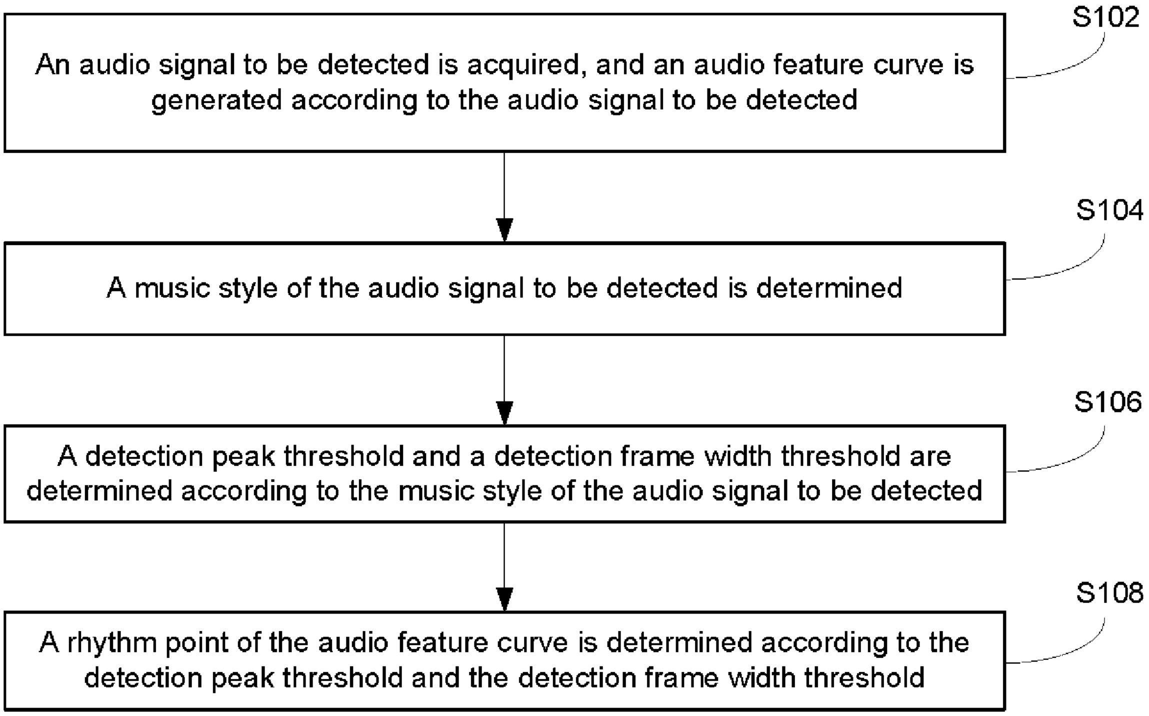
FIG. 1 is a flowchart of a rhythm point detection method according to an embodiment of the present disclosure.

In order to make the purpose, technical solutions and advantages of the embodiments of the present disclosure clearer, the technical solutions of the present disclosure will be clearly and completely described below in combination with the drawings. It is apparent that the described embodiments are not all embodiments but part of the embodiments of the present disclosure. All other embodiments obtained by those skilled in the art according to the embodiments in the present disclosure without creative work shall fall within the scope of protection of the present disclosure.

Under a normal condition, when a dance is arranged through the computer software, a user usually manually inputs a movement sequence on multiple continuous animation frames according to a rhythm point of music to drive a 3D model to complete dance movements, and may also select some disclosed movement sequences for direct use. In either manner, the user selects the rhythm point of the music according to experiences, the process is time-consuming, labor-consuming and inaccurate, and it is difficult to meet a requirement of music rhythm detection for dance arrangement.

Music rhythm detection is an important branch of Music Information Retrieval (MIR). Music rhythm detection in a narrow sense refers to music beat detection. When a piece of music is equally divided into basic elements according to a time factor, each basic element is called a "meter" or a beat, including a common weak beat, strong beat, single meter and compound meter, etc., and these meters form a bar according to a certain rule to further form the music. For such beat detection, there is a relatively perfect detection flow at present. Under a normal condition, a segment of music signal is given, all onsets (moments when musical instruments suddenly produce sounds) in the music signal may be detected at first, then Beats Per Minute (BPM) of music is estimated according to the onsets, and finally, the specific onsets that are music beats are defined and corrected according to the BPM of the music. That is, the finally detected music beats may reflect a music bar rule to a certain extent and are periodic.

In fact, for dance arrangement, conventional music beat detection has the following problems.

As to problem one, a conventional music beat is small in granularity. For example, for music of which BPM is 120, there are two beats per second; and for music for dance arrangement, rhythm points are relatively "sparse", and there may be one beat every one to two seconds.

As to problem two, dance arrangement is partly staged and aperiodic, so a dance with rich movements may be presented. Conventional music beats are periodic, and thus a user is required to judge specific continuous beats that may form a dance sequence by experiences. A dance may reflect a content of music to a certain extent, and may also reflect changes of a music rhythm and keep characteristics of dance movements generally and locally. Through an existing technical solution to music beat detection, problems of music beat detection for dance arrangement may not be effectively solved.

As to problem three, all existing common onset detection methods are relatively partial, these methods have different advantages and disadvantages, and detection effects are not so ideal. Moreover, music of different styles corresponds to different music beat densities, and when the same measurement index is adopted to detect music beats, effects are not so reasonable.

Based on above-mentioned problems, at least some embodiments of the present disclosure provide a rhythm point detection method and apparatus and an electronic device, to alleviate the technical problems.

For conveniently understanding the embodiments, the rhythm point detection method disclosed in the at least some embodiments of the present disclosure will be introduced in detail at first.

In an embodiment of the present disclosure, a rhythm point detection method is provided. Specifically, FIG. 1 shows a flowchart of a rhythm point detection method according to an embodiment of the present disclosure. The following steps are included.

In step S102, an audio signal to be detected is acquired, and an audio feature curve is generated according to the audio signal to be detected.

In an optional embodiment of the present disclosure, the audio signal to be detected is mostly dance music for dance arrangement. The audio signal to be detected includes multiple continuous frame sequences, and the audio feature curve is a curve including an audio feature of the audio signal to be detected. Through the audio feature curve, a rhythm point of the audio signal to be detected may be obtained after each of the following steps is continued to be executed. A rhythm point detection process of music may also be called a detection process for an onset of the music. Through the rhythm point of the music, a user may determine specific beats which may form a sequence such that the detected rhythm point may meet arrangement of a dance better.

In step S104, a music style of the audio signal to be detected is determined.

In step S106, a detection peak threshold and a detection frame width threshold are determined according to the music style of the audio signal to be detected.

In step S108, a rhythm point of the audio feature curve is determined according to the detection peak threshold and the detection frame width threshold.

Specifically, music of different music styles is different in rhythm. Therefore, after the music style of the audio signal to be detected is determined, at least one corresponding threshold parameter may be determined according to the music style in S106 to further detect the rhythm point corresponding to a rhythm according to the at least one threshold parameter. For example, music of a Chinese style is relatively slow in rhythm and relatively low in beat density, and music of a Korean style is relatively fast in rhythm and relatively high in beat density. Therefore, the detected rhythm point is more applicable to dance arrangement.

Through the rhythm point detection method provided in an optional embodiment of the present disclosure, the audio signal to be detected may be acquired, the audio feature curve may be generated according to the audio signal to be detected, the music style of the audio signal to be detected may be determined, and the detection peak threshold and the detection frame width threshold may be determined according to the music style of the audio signal to be detected to determine the rhythm point of the audio feature curve according to the detection peak threshold and the detection frame width threshold, thereby implementing an automatic detection process of the rhythm point. Moreover, the audio feature curve fuses the energy feature curve and the spectrum feature curve, so that the rhythm point may be detected more accurately. The detection peak threshold and the detection frame width threshold are determined according to the music style, so that automatic rhythm point detection may be performed on audio signals to be detected of different styles, and a music rhythm detection requirement is effectively met.

During specific implementation, in an optional embodiment of the present disclosure, the audio feature in the audio feature curve is an energy feature and a spectrum feature. Therefore, the audio feature curve generated in S102 is generated according to an energy feature curve and spectrum feature curve corresponding to the audio signal to be detected, and the energy feature curve and the spectrum feature curve are generated according to the energy feature and spectrum feature of the audio signal to be detected respectively. Specifically, for a segment of audio signal to be detected, an audio waveform digital signal may be read from an audio file of dance music through an audio reading interface corresponding to the audio signal to be detected. An energy feature and a spectrum feature are extracted for the audio waveform digital signal, and an energy feature curve and a spectrum feature curve of the audio signal to be detected are generated to further generate an audio feature curve of the dance music.

Therefore, an operation of S102 usually includes the following process. The energy feature curve and the spectrum feature curve corresponding to the audio signal to be detected are extracted. And the audio feature curve containing a fused feature value is generated according to the energy feature curve and the spectrum feature curve.

An abscissa of the audio feature curve is a frame sequence number after time-based sequencing, an ordinate is the fused feature value, and the fused feature value includes an energy feature value and a spectrum feature value.

During specific implementation, for a segment of audio signal to be detected, when an energy feature and a spectrum feature are extracted, a feature extractor is adopted for extraction. The feature extractor may be implemented according to a corresponding programming language, specifically with reference to the related art, and no limits are made in an optional embodiment of the present disclosure.

In an optional embodiment, when the feature extractor extracts the features, the input audio waveform digital signal is usually read from the audio file in a specified format. Audio files in different formats are processed through different programming languages. Therefore, before the audio waveform digital signal is read, it is also necessary to convert a format of the dance music to the specified audio format. For example, for an audio reading interface of a Python programming language, an audio in a WAV format is usually read. Therefore, when the Python programming language is adopted for processing, it is usually necessary to convert audios in different formats to the WAV format according to a corresponding audio trans-coding component. That is, through calling an external command, such as sox, the audios in different formats are converted to an audio in a WAV format, and then the audio waveform digital signal is read from the audio in the WAV format. For example, for a piece of 4-minute music, after an audio waveform digital signal is read, 4*60*44,100 sampling points may be obtained, a sampling rate being 44,100 Hz, namely 44,100 sampling points are recorded per second, and the audio waveform digital signal may be recorded as x(t).

Figure 2:
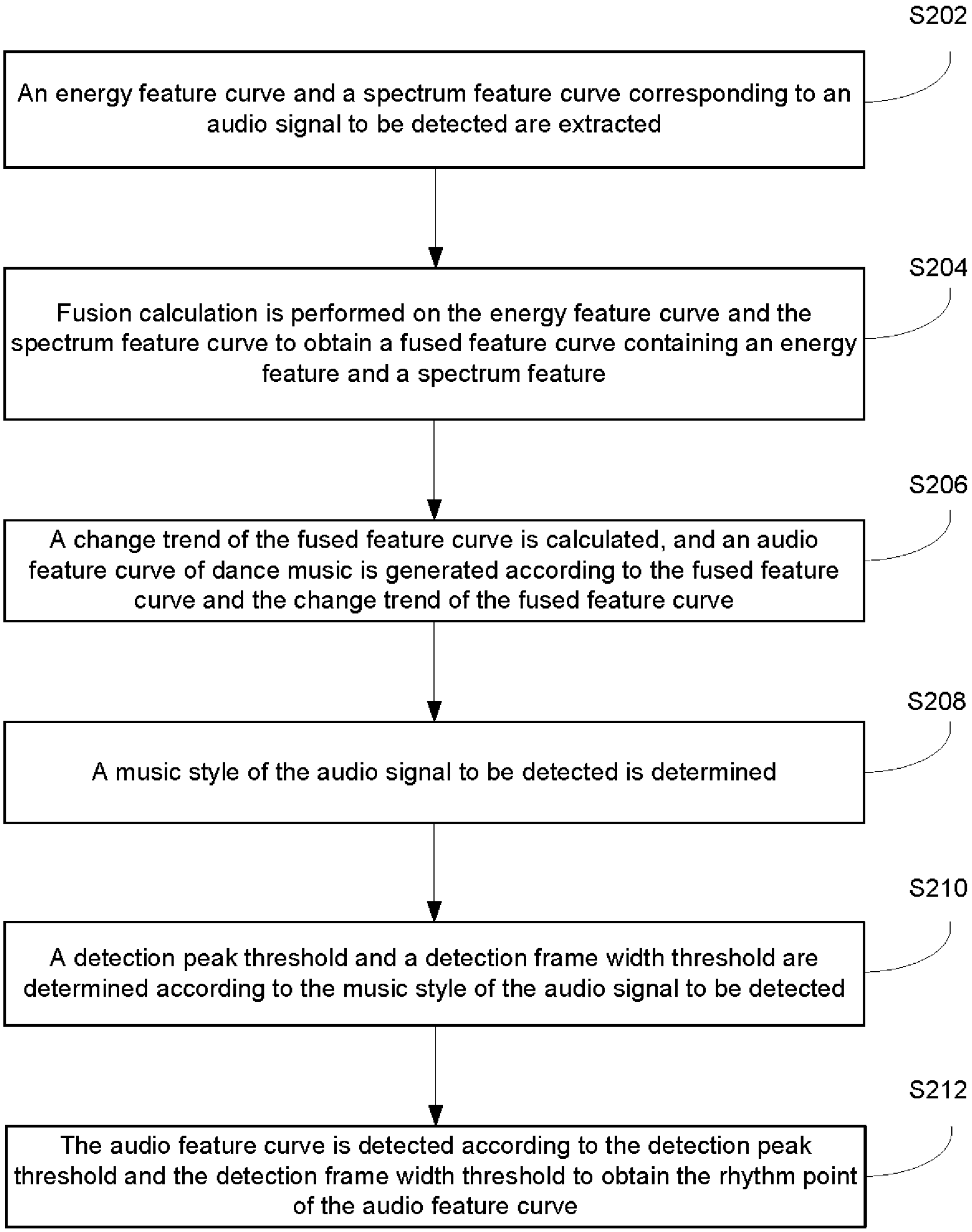
FIG. 2 is a flowchart of another rhythm point detection method according to an embodiment of the present disclosure.

In an optional embodiment, after the energy feature and the spectrum feature are extracted, it is also necessary to perform fusion calculation on the energy feature curve and the spectrum feature curve in the process of generating the audio feature curve of the audio signal to be detected. Specifically, FIG. 2 shows a flowchart of another rhythm point detection method according to an embodiment of the present disclosure. A rhythm point detection process is described in detail. As shown in FIG. 2, the following steps are included.

In step S202, an energy feature curve and a spectrum feature curve corresponding to an audio signal to be detected are extracted.

In step S204, fusion calculation is performed on the energy feature curve and the spectrum feature curve to obtain a fused feature curve containing an energy feature and a spectrum feature.

During specific implementation, a fusion calculation process is implemented according to the condition that effects of detection methods for the energy feature and the spectrum feature respectively are not so good, and the energy feature and the spectrum feature may be fused to achieve a purpose of remedying respective defects.

For example, for a T-second audio signal to be detected, when the energy feature and the spectrum feature are calculated, framing processing is performed on an audio waveform digital signal x(t) at first. Specifically, a framing window length is w seconds, and a frame shift step is s seconds. Through the feature extractor, N frames of energy features, recorded as $E\in \mathbb{R}^{1\times N}$, may be obtained. $\mathbb{R}$ represents a feature vector, N=T/s, T is a length of the dance music, s is the frame shift step, and N represents a numerical value when each frame of energy feature is one-dimensional. In addition, N frames of spectrum features, recorded as $S\in \mathbb{R}^{D\times N}$, may also be obtained, and D=w/2+1 represents a feature vector when each frame of spectrum feature is D-dimensional, and w is the framing window length. Therefore, the energy feature E and the spectrum feature S may be obtained.

In an optional embodiment, considering that the energy feature is a one-dimensional vector and the spectrum feature is D-dimensional, before fusion calculation, it is also necessary to perform dimensionality reduction processing on the spectrum feature curve to obtain a dimensionality-reduced spectrum feature curve corresponding to the spectrum feature curve. Then, fusion calculation is performed on the energy feature curve and the dimensionality-reduced spectrum feature curve to obtain the fused feature curve containing the energy feature and the spectrum feature.

Specifically, dimensionality reduction is performed on the spectrum feature S in a feature dimension, and the dimensionality-reduced feature curve may be represented as $$\overline{S}_i = \frac{1}{D}\sum_{j=1}^{D} S_i[j],$$

and $S_i$ represents the feature vector of the ith frame. Before dimensionality reduction, each frame has a D-dimensional feature vector, so that a spectrum feature curve, recorded as $\overline{S}\in \mathbb{R}^{1\times N}$, of which a dimensionality is the same as the energy feature curve is obtained through the formula, and then fusion calculation is performed on the dimensionality-reduced spectrum feature curve and the energy feature curve.

In step S206, a change trend of the fused feature curve is calculated, and an audio feature curve of dance music is generated according to the fused feature curve and the change trend of the fused feature curve.

During specific implementation, the fused feature curve is represented as $F_i=\alpha\times(\overline{S}_i+E_i)$, and $F_i$ is the fused feature curve, a is a fusion constant and is usually 0.5, i is the frame number of the multiple continuous frame sequences, $\overline{S}_i$ is the dimensionality-reduced spectrum feature curve, and $E_i$ is the energy feature curve.

Based on the fused feature curve, an operation of calculating the change trend of the fused feature curve includes the following steps. Sliding window processing is performed on the fused feature curve to obtain the change trend corresponding to the fused feature curve, a change trend curve corresponding to the change trend of the fused feature curve being represented as:

$$C_i = \frac{1}{2\times M+1}\sum_{j=-M}^{j=M} F_{i+j},$$

and M represents the number of fused features, i and j represent a frame number. Specifically, j represents a frame number different from the frame number i in the multiple continuous frame sequences.

Specifically, a local sliding window method is adopted for sliding window processing. A relatively flat curve capable of generally reflecting the change trend of the fused feature curve may be obtained. The change trend curve is usually represented as $C\in \mathbb{R}^{1\times F}$, and F represents the fused feature curve, and C represents the change trend curve of the fused feature curve.

In step S206, product operation may be performed on the fused feature curve and the change trend curve to generate the audio feature curve. The audio feature curve is represented as $O_i=F_i\times C_i$, and may also be recorded as $O\in \mathbb{R}^{1\times N}$.

In step S208, a music style of the audio signal to be detected is determined.

Specifically, when the music style of the audio signal to be detected is determined, the audio signal to be detected may be input to a pre-trained neural network model with a music style determination function, and the music style of the audio signal to be detected is determined through the neural network model.

During a practical application, the pre-trained neural network model with the music style determination function may be used as a music style classifier to determine the music style of the dance music, for example, a Chinese style, a two-dimensional style and a Korean style. Then, the step S210 is executed to design different threshold parameters according to different music styles, and the audio feature curve is detected according to a process of the step S210 to the step S212 to obtain a rhythm point of the audio feature curve.

The pre-trained neural network model is usually trained through music sample data with a music style label. Moreover, in an optional embodiment of the present disclosure, a learning classification model is used as an example of the pre-trained neural network model. Therefore, a training process of the neural network model may include the following process. The music sample data with the music style label is acquired, and the music sample data is input to the learning classification model to train the learning classification model to generate the neural network model with the music style determination function.

In step S210, a detection peak threshold and a detection frame width threshold are determined according to the music style of the audio signal to be detected.

In step S212, the audio feature curve is detected according to the detection peak threshold and the detection frame width threshold to obtain the rhythm point of the audio feature curve.

A fused feature value of the rhythm point is more than or equal to the detection peak threshold, and the fused feature value of the rhythm point is a maximum value in a curve segment, corresponding to the detection frame width threshold, of the audio feature curve.

Specifically, for music of different music styles, there are certain differences between strength and densities of onsets of rhythm points of audio signals to be detected. Therefore, for music of different music styles, detection bases may usually be different. In an optional embodiment of the present disclosure, two threshold parameters related to the music style are adopted, i.e., the detection peak threshold and the detection frame width threshold, the detection peak threshold is usually represented with α, and the detection frame width threshold is usually represented with β. Moreover, in an optional embodiment of the present disclosure, it is specified that a frame where a crest value of the audio feature curve exceeds the detection peak threshold α and the crest value is maximum in a range of β frames before and after the frame is considered as a rhythm point or an onset. Determining such a rhythm point as a music rhythm point of the audio signal to be detected 0 is relatively accurate. A specific detection process is as follows.

In step (1), the crest value of the audio feature curve is detected.

In step (2), a frame where the crest value exceeds the detection peak threshold is determined as a frame to be determined.

In step (3), a curve segment corresponding to multiple frames before the frame to be determined and multiple frames after the frame to be determined on the audio feature curve is determined. The number of the multiple frames before the frame to be determined is equal to the detection frame width threshold, and the number of the multiple frames after the frame to be determined is equal to the detection frame width threshold.

In step (4), in responding to a maximum value in the curve segment is a fused feature value corresponding to the frame to be determined, the frame to be determined is determined as the rhythm point.

Specifically, the rhythm point usually refers to a position where a crest of the audio feature curve suddenly appears. For reflecting the segment from the rhythm point to the peak better, during the practical application, a result obtained by subtracting a present frame from a next frame is determined as a new value of the present frame, so that all values on the audio feature curve dropping after the peak may become negative. This part may be directly truncated, for example, assigned with 0, and then the curve of the change trend of the fused feature curve is multiplied to obtain a rhythm point enhanced curve, which may be recorded as O %. The formula is as follows:

$$O_i\% = C_i\frac{|O_{i+1} - O_i| + O_{i+1} - O_i}{2}.$$

For the rhythm point enhanced curve, different threshold parameters α and β may be set according to the music style of the dance music. The same set of detection mechanism is adopted for different music styles, and relatively better rhythm points for dance arrangement may be obtained.

In an optional embodiment, considering that a piece of music usually includes structures of an intro, a verse, a chorus, a bridge, an outro and the like, when the rhythm point detection method provided in an optional embodiment of the present disclosure is used, each structure may be detected. Specifically, structure detection may be performed on the dance music to generate multiple structural segments of the dance music, the multiple structural segments including at least one of an audio intro segment, an audio verse segment, an audio chorus segment and an audio outro segment.

For each structural segment, an audio feature curve is generated according to an audio signal, and the method shown in FIG. 1 or FIG. 2 is further executed to implement rhythm point detection of each structural segment.

In addition, for making a rhythm point of each structural segment more accurate, for structural segments of the same structure in the multiple structural segments, alignment correction may further be performed on detected rhythm point information according to an alignment algorithm.

For example, for a piece of complete dance music, a structure detection process of the dance music may be implemented according to a music structure detector. That is, after the complete dance music is input to the music structure detector, totally five pieces of structural information and seven structural segments may be obtained: an intro, verses, choruses, a bridge and an outro, as shown in the following table.

| Intro | Verse | Chorus | Bridge | Verse | Chorus | Outro |
|---|---|---|---|---|---|---|

Music signals of the seven structural segments may be detected according to the rhythm point detection method shown in FIG. 1 or FIG. 2 to obtain respective rhythm points for dance arrangement respectively, and then the rhythm points of the same structure may be aligned according to the alignment algorithm.

For example, when a rhythm point frame sequence of the first verse is [5, 6, 8, 10, 11, 14], and a rhythm point frame sequence of the second verse is [15, 16, 18, 20, 23, 24], after performing the alignment process, the rhythm point frame sequence of the second verse is [5, 6, 8, 10, 12, 14], and the rhythm point frame sequence of the second verse is [15, 16, 18, 20, 22, 24].

After such alignment correction processing, the rhythm points of the same structural segment may be at the same content. Therefore, after a piece of dance music is processed through the rhythm point detection method provided in an optional embodiment of the present disclosure, rhythm points for dance arrangement may be obtained, and the rhythm points of the same part are aligned. In addition, a density of the rhythm points of the music is consistent with a music style of the music, when producing an animation for dance arrangement according to the rhythm points through computer software, a user may rapidly edit and insert movements according to the rhythm points, and moreover, a movement sequence of the same part is required to be produced only once.

During specific implementation, the structure detection process of the dance music may be implemented according to a self-similarity matrix theory, and in addition, may also be implemented in another manner. The music structure detection process may specifically be implemented with reference to the related art, and no limits are made thereto in an optional embodiment of the present disclosure.

Figure 3:
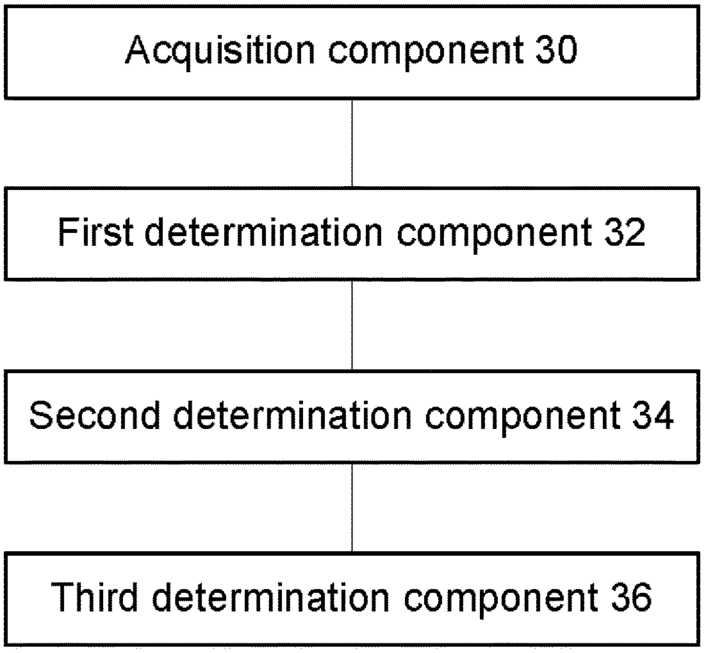
FIG. 3 is a structural diagram of a rhythm point detection apparatus according to an embodiment of the present disclosure.

In another embodiment of the present disclosure, a rhythm point detection apparatus is further provided. FIG. 3 is a structural diagram of a rhythm point detection apparatus. The apparatus includes:

- an acquisition component 30, configured to acquire an audio signal to be detected and generate an audio feature curve according to the audio signal to be detected;
- a first determination component 32, configured to determine a music style of the audio signal to be detected;
- a second determination component 34, configured to determine a detection peak threshold and a detection frame width threshold according to the music style of the audio signal to be detected; and
- a third determination component 36, configured to determine a rhythm point of the audio feature curve according to the detection peak threshold and the detection frame width threshold.

In an optional embodiment, the acquisition component 30 is configured to extract an energy feature curve and a spectrum feature curve corresponding to the audio signal to be detected and generate the audio feature curve containing a fused feature value according to the energy feature curve and the spectrum feature curve, an abscissa of the audio feature curve being a frame sequence number after time-based sequencing, an ordinate being the fused feature value and the fused feature value including an energy feature value and a spectrum feature value.

In an optional embodiment, the third determination component 36 is configured to detect the audio feature curve according to the detection peak threshold and the detection frame width threshold to obtain the rhythm point of the audio feature curve, a fused feature value of the rhythm point being more than or equal to the detection peak threshold and the fused feature value of the rhythm point being a maximum value in a curve segment, corresponding to the detection frame width threshold, of the audio feature curve.

In an optional embodiment, the third determination component 36 is further configured to detect a crest value of the audio feature curve, determine a frame where the crest value exceeds the detection peak threshold as a frame to be determined, determine a curve segment corresponding to multiple frames before the frame to be determined and multiple frames after the frame to be determined on the audio feature curve, the number of the multiple frames before the frame to be determined is equal to the detection frame width threshold, the number of the multiple frames after the frame to be determined is equal to the detection frame width threshold, and in responding to a maximum value in the curve segment is a fused feature value corresponding to the frame to be determined, determine the frame to be determined as the rhythm point.

In an optional embodiment, the acquisition component 30 is configured to perform fusion calculation on the energy feature curve and the spectrum feature curve to obtain a fused feature curve including an energy feature and a spectrum feature, calculate a change trend of the fused feature curve and generate the audio feature curve is generated according to the fused feature curve and the change trend of the fused feature curve.

In an optional embodiment, the acquisition component 30 is further configured to perform dimensionality reduction processing on the spectrum feature curve to obtain a dimensionality-reduced spectrum feature curve corresponding to the spectrum feature curve and perform fusion calculation on the energy feature curve and the dimensionality-reduced spectrum feature curve to obtain the fused feature curve containing the energy feature and the spectrum feature.

The fused feature curve is represented as $F_i=a\times(\overline{S_i}+E_i)$, and $F_i$ is the fused feature curve, a is a fusion constant, i is the frame number of the multiple continuous frame sequences, $\overline{S_i}$ is the dimensionality-reduced spectrum feature curve, and $E_i$ is the energy feature curve.

The acquisition component 30 is further configured to perform sliding window processing on the fused feature curve to obtain the change trend corresponding to the fused feature curve, a change trend curve corresponding to the change trend of the fused feature curve being represented as:

$$C_i = \frac{1}{2\times M+1}\sum_{j=-M}^{j=M} F_{i+j},$$

and M represents the number of fused features, i and j represent a frame number.

In an optional embodiment, the acquisition component 30 is further configured to perform product operation on the fused feature curve and the change trend curve to generate the audio feature curve, the audio feature curve being represented as $O_i=F_i\times C_i$.

Figure 4:
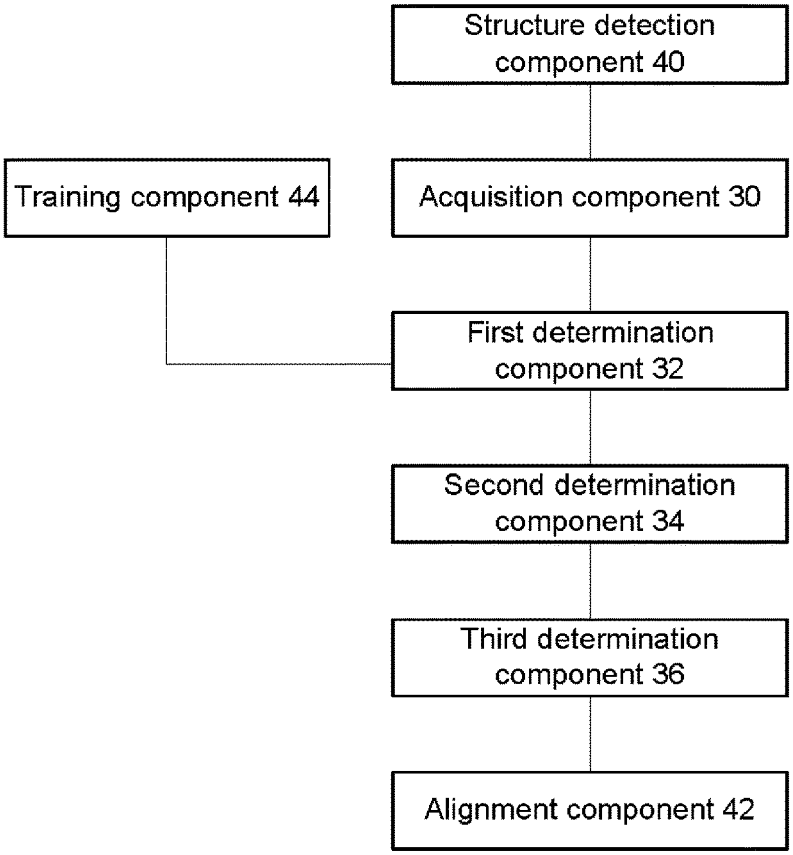
FIG. 4 is a structural diagram of another rhythm point detection apparatus according to an embodiment of the present disclosure.

Based on FIG. 3, FIG. 4 shows a structural diagram of another rhythm point detection apparatus. Besides the structures shown in FIG. 3, the apparatus further includes:

- a structure detection component 40, configured to perform structure detection on dance music to generate multiple structural segments of the dance music, the multiple structural segments including at least one of an audio intro segment, an audio verse segment, an audio chorus segment and an audio outro segment, and for each structural segment, generate the audio feature curve according to the audio signal; and
- an alignment component 42, configured to, for structural segments of the same structure in the multiple structural segments, perform alignment correction on detected rhythm point information according to an alignment algorithm.

In an optional embodiment, the first determination component 32 is configured to input the audio signal to be detected to a pre-trained neural network model with a music style determination function and determine the music style of the audio signal to be detected through the neural network model.

In an optional embodiment, the apparatus further includes: a training component 44, configured to acquire music sample data with a music style label and input the music sample data to a learning classification model to train the learning classification model to generate the neural network model with the music style determination function.

Through the rhythm point detection apparatus provided in an optional embodiment of the present disclosure, the audio signal to be detected may be acquired, the audio feature curve may be generated according to the audio signal to be detected, the music style of the audio signal to be detected may be determined, and the detection peak threshold and the detection frame width threshold may be determined according to the music style of the audio signal to be detected to determine the rhythm point of the audio feature curve according to the detection peak threshold and the detection frame width threshold, thereby implementing an automatic detection process of the rhythm point. Moreover, the audio feature curve fuses the energy feature curve and the spectrum feature curve, so that the rhythm point may be detected more accurately. The detection peak threshold and the detection frame width threshold are determined according to the music style, so that automatic rhythm point detection may be performed on audio signals to be detected of different styles, and a music rhythm detection requirement is effectively met.

An implementation principle and technical effects of the rhythm point detection apparatus provided in an optional embodiment of the present disclosure are the same as those of the embodiment of the rhythm point detection method. For brief description, unmentioned parts of the embodiment of the apparatus may refer to the corresponding contents in the method embodiment and will not be elaborated herein.

It is to be noted here that the acquisition component 30, the first determination component 32, the second determination component 34, the third determination component 36, the structure detection component 40, the alignment component 42 and the like may run in a computer terminal as a part of the device, and functions realized by the components may be executed through a processor in the computer terminal. The terminal may also be a smart phone (such as an Android phone and an iOS phone), a tablet computer, a palm computer, a Mobile Internet Device (MID), a Personal Digital Assistant (PDA) and another terminal device.

All the function elements provided in an optional embodiment of the application may run in a mobile terminal, a computer terminal or a similar operating device, and may also be stored as a part of a storage medium.

Therefore, in another embodiment of the present disclosure, a computer terminal is further provided. The computer terminal may be any computer terminal device in a computer terminal group. Optionally, in an optional embodiment, the computer terminal may also be replaced with a mobile terminal and another terminal device.

Optionally, in an optional embodiment, the computer terminal may be in at least one of multiple network devices of a computer network.

In an optional embodiment, the computer terminal may execute program codes for the following steps in a rhythm point detection method: an audio signal to be detected is acquired, and an audio feature curve is generated according to the audio signal to be detected; a music style of the audio signal to be detected is determined; a detection peak threshold and a detection frame width threshold are determined according to the music style of the audio signal to be detected; and a rhythm point of the audio feature curve is determined according to the detection peak threshold and the detection frame width threshold.

Optionally, the computer terminal may include: at least one than one processor, a memory and a transmission device.

Herein, the memory may be configured to store a software program and component, for example, a program instruction or component corresponding to the rhythm point detection method in at least some embodiments of the present disclosure. The processor executes various function applications and data processing by running the software program and component stored in the memory, namely implementing the rhythm point detection method. The memory may include a high-speed Random Access Memory (RAM), and may also include a nonvolatile memory, for example, at least one magnetic storage device, a flash memory, or another nonvolatile solid state memory. In some examples, the memories may further include a memory remotely set relative to the processor, and the remote memory may be connected to the terminal through a network. Examples of the network include, but not limited to, the Internet, an intranet of an enterprise, a local area network, a mobile communication network and a combination thereof.

The transmission device is configured to receive or send data through a network. Specific examples of the network may include a wired network and a wireless network. In an example, the transmission device includes a Network Interface Controller (NIC), which may be connected with another network device and a router through a network cable to communicate with the Internet or a local area network. In an example, the transmission device is a Radio Frequency (RF) component, which is configured to communicate with the Internet wirelessly.

Particularly, the memory is configured to store information of a preset action condition and a preset permission user, and an application program.

The processor may call, through the transmission device, the information and application program stored in the memory, so as to execute the program codes of the steps in each alternative or preferred embodiment of the method.

Those of ordinary skill in the art may understand that the computer terminal may also be a smart phone (such as an Android phone and an iOS phone), a tablet computer, a palm computer, an MID, a PDA and another terminal device.

Those of ordinary skill in the art may understand that all or part of the steps in the method of the above embodiments may be completed by hardware related to the terminal device instructed by a program. The program may be stored in computer-readable storage medium. The storage medium may include: a flash disk, a Read-Only Memory (ROM), a RAM, a magnetic disk or a compact disc.

In another embodiment of the present disclosure, an electronic device is further provided, which includes a memory, a processor and a computer program stored in the memory and capable of running in the processor, the processor executing the computer program to implement the steps of the rhythm point detection method provided in at least some abovementioned embodiments.

Figure 5:
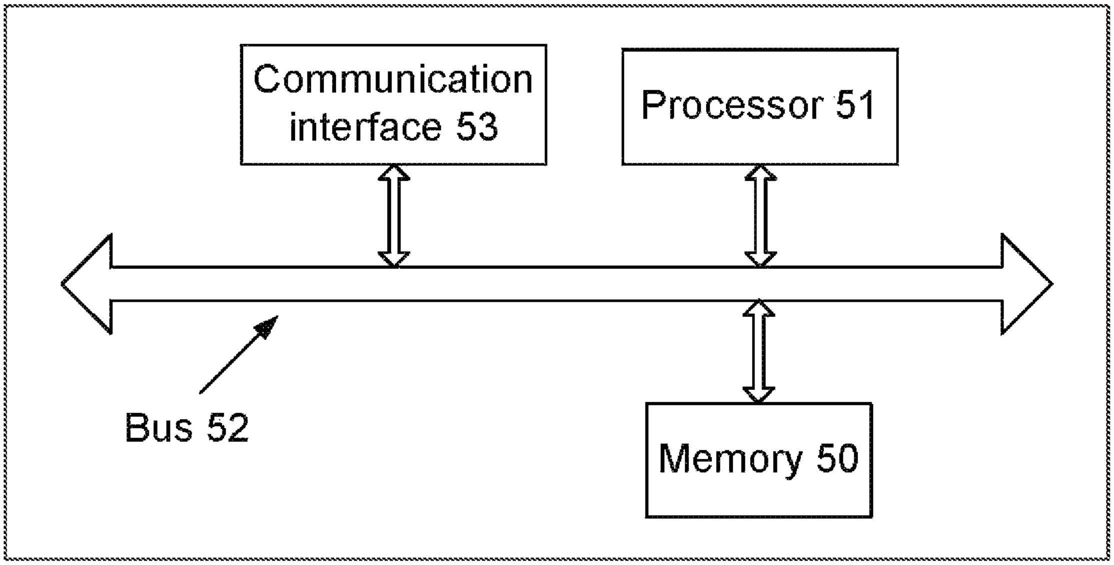
FIG. 5 is a structural diagram of an electronic device according to an embodiment of the present disclosure.

In another embodiment of the present disclosure, a structure diagram of an electronic device is further provided. FIG. 5 is the structural diagram of the electronic device. The electronic device includes a processor 51 and a memory 50.

The memory 50 stores a computer-executable instruction that may be executed by the processor 51. The processor 51 executes the computer-executable instruction to implement the rhythm point detection method.

In the embodiment shown in FIG. 5, the electronic device further includes a bus 52 and a communication interface 53. The processor 51, the communication interface 53 and the memory 50 are connected through the bus 52.

The memory 50 may include a high-speed RAM, and may also include a non-volatile memory, for example, at least one disk memory. Communication connection between a system network element and at least one another network element is implemented through at least one communication interface 53 (which may be wired or wireless), and the Internet, a wide area network, a local network, a metropolitan area network and the like may be used. The bus 52 may be an Industry Standard Architecture (ISA) bus, a Peripheral Component Interconnect (PCI) bus or an Extended Industry Standard Architecture (EISA) bus, etc. The bus 52 may be divided into an address bus, a data bus, a control bus and the like. For convenient representation, a double sided arrow is adopted for representation in FIG. 5, but it does not mean that there is only one bus or only one type of buses.

The processor 51 may be an integrated circuit chip, and has a signal processing capability. In an implementation process, each step of the method may be completed through an integrated logic circuit of hardware in the processor 51 or an instruction in a software form. The processor 51 may be a universal processor, including a Central Processing Unit (CPU), a Network Processor (NP) and the like, and may also be a Digital Signal Processor (DSP), an Application Specific Integrated Circuit (ASIC), a Field-Programmable Gate Array (FPGA) or another programmable logic device, a discrete or transistor logic device, and a discrete hardware component. The universal processor may be a microprocessor, or the processor may also be any conventional processor and the like. The steps of the method disclosed in combination with the embodiments of the present disclosure may be directly embodied to be executed and completed by a hardware decoding processor or executed and completed by a combination of hardware and software components in the decoding processor. The software component may be located in a mature storage medium in this field such as a RAM, a flash memory, a ROM, a programmable ROM or electrically erasable programmable ROM and a register. The storage medium is located in the memory, and the processor 51 reads information in the memory, and completes the steps of the rhythm point detection method of the abovementioned embodiment in combination with hardware.

In another embodiment of the present disclosure, a computer-readable storage medium is provided, a computer program is stored in the computer-readable storage medium, and the computer program is operated by a processor to execute the steps of the above-mentioned method.

A computer program product for the rhythm point detection method and apparatus and electronic device provided in at least some embodiments of the present disclosure includes a computer-readable storage medium storing a program code, and an instruction in the program code may be configured to execute the method in the method embodiment. Specific implementation may refer to the method embodiment and will not be elaborated herein.

Those skilled in the art may clearly learn about that, for convenient and brief description, specific working processes of the device described above may refer to the corresponding processes in the method embodiments and will not be elaborated herein.

In addition, in the descriptions of the embodiments of the present disclosure, unless otherwise explicitly specified and limited, terms "mount", "connected" and "connect" should be broadly understood, for example, may refer to fixed connection, may also refer to detachable connection or integral connection, may refer to mechanical connection, may also refer to electrical connection, may refer to direct connection, may also be indirection connection through an intermediate and may refer to communication of interiors of two components. Those skilled in the art may understand specific meanings of the terms in the present disclosure according to specific conditions.

When being implemented in form of software functional element and sold or used as an independent product, the function may be stored in a computer-readable storage medium. Based on such an understanding, the technical solutions of the present disclosure substantially or parts making contributions to the conventional art or part of the technical solutions may be embodied in form of software product. The computer software product is stored in a storage medium, including multiple instructions configured to enable a computer device (which may be a personal computer, a server, a network device or the like) to execute all or part of the steps of the method in each embodiment of the present disclosure. The storage medium includes various media capable of storing program codes such as a U disk, mobile hard drive, a ROM, a RAM, a magnetic disk or a compact disc.

In the descriptions of the present disclosure, it is to be noted that directional or positional relationships indicated by terms "central", "above", "below", "left", "right", "vertical", "inside", "outside" and the like are directional or positional relationships shown in the drawings, are adopted not to indicate or imply that involved devices or elements are required to have specific orientations and be structured and operated with the specific orientations but to conveniently and simply describe the present disclosure and thus should not be understood as limits to the present disclosure. In addition, terms "first", "second" and "third" are for description and should not be understood to indicate or imply relative importance.

It is finally to be noted that the above embodiments are specific embodiments of the present disclosure and are adopted not to limit but to describe the technical solutions of the present disclosure and the scope of the present disclosure is not limited thereto. Although the present disclosure is described with reference to the abovementioned embodiments in detail, it is understood by those skilled in the art those skilled in the art may still make modifications or apparent variations to the technical solutions recorded in the abovementioned embodiments or make equivalent replacements to part of technical features therein within the technical scope disclosed in the present disclosure, and these modifications, variations or replacements do not make the essences of the corresponding technical solutions depart from the spirit and scope of the technical solutions of the embodiments of the present disclosure and shall all fall within the scope of protection of the present disclosure. Therefore, the scope of protection of the present disclosure shall be subject to the scope of protection of the claims.

What is claimed is:

1. A rhythm point detection method, comprising:

acquiring an audio signal to be detected, and generating an audio feature curve according to the audio signal to be detected;

determining a music style of the audio signal to be detected;

determining a detection peak threshold and a detection frame width threshold according to the music style of the audio signal to be detected; and determining a rhythm point of the audio feature curve according to the detection peak threshold and the detection frame width threshold.

2. The method as claimed in claim 1, wherein generating the audio feature curve according to the audio signal to be detected comprises:

extracting an energy feature curve and a spectrum feature curve corresponding to the audio signal to be detected, and generating the audio feature curve containing a fused feature value according to the energy feature curve and the spectrum feature curve;

wherein an abscissa of the audio feature curve is a frame sequence number after time-based sequencing, an ordinate is the fused feature value, and the fused feature value comprising an energy feature value and a spectrum feature value.

3. The method as claimed in claim 2, wherein determining the rhythm point of the audio feature curve according to the detection peak threshold and the detection frame width threshold comprises:

detecting the audio feature curve according to the detection peak threshold and the detection frame width threshold to obtain the rhythm point of the audio feature curve; wherein the fused feature value of the rhythm point is more than or equal to the detection peak threshold, and the fused feature value of the rhythm point is a maximum value in a curve segment, corresponding to the detection frame width threshold, of the audio feature curve.

4. The method as claimed in claim 3, wherein detecting the audio feature curve according to the detection peak threshold and the detection frame width threshold to obtain the rhythm point of the audio feature curve comprises:

detecting a crest value of the audio feature curve;

determining a frame where the crest value exceeds the detection peak threshold as a frame to be determined;

determining a curve segment corresponding to a plurality of frames before the frame to be determined and a plurality of frames after the frame to be determined on the audio feature curve, the number of the plurality of frames before the frame to be determined being equal to the detection frame width threshold, the number of the plurality of frames after the frame to be determined being equal to the detection frame width threshold; and in responding to a maximum value in the curve segment is the fused feature value corresponding to the frame to be determined, determining the frame to be determined as the rhythm point.

5. The method as claimed in claim 2, wherein generating the audio feature curve containing the fused feature value according to the energy feature curve and the spectrum feature curve comprises:

performing fusion calculation on the energy feature curve and the spectrum feature curve to obtain a fused feature curve comprising an energy feature and a spectrum feature; and calculating a change trend of the fused feature curve, and generating the audio feature curve according to the fused feature curve and the change trend of the fused feature curve.

6. The method as claimed in claim 5, wherein performing fusion calculation on the energy feature curve and the spectrum feature curve to obtain the fused feature curve containing the energy feature and the spectrum feature comprises:

performing dimensionality reduction processing on the spectrum feature curve to obtain a dimensionality-reduced spectrum feature curve corresponding to the spectrum feature curve; and performing fusion calculation on the energy feature curve and the dimensionality-reduced spectrum feature curve to obtain the fused feature curve containing the energy feature and the spectrum feature.

7. The method as claimed in claim 6, wherein the fused feature curve is represented as $F_i=a\times(\overline{S_i}+E_i)$;

wherein $F_i$ is the fused feature curve, a is a fusion constant, i is the frame number of a plurality of continuous frame sequences, $\overline{S_i}$ is the dimensionality-reduced spectrum feature curve, and $E_i$ is the energy feature curve; and calculating the change trend of the fused feature curve comprising:

performing sliding window processing on the fused feature curve to obtain the change trend corresponding to the fused feature curve, a change trend curve corresponding to the change trend of the fused feature curve being represented as:

$$C_i = \frac{1}{2\times M+1}\sum_{j=-M}^{j=M} F_{i+j},$$

wherein M represents the number of fused features, i and j represent a frame number.

8. The method as claimed in claim 7, wherein generating the audio feature curve according to the fused feature curve and the change trend of the fused feature curve comprises:

performing product operation on the fused feature curve and the change trend curve to generate the audio feature curve, wherein the audio feature curve is represented as $O_i=F_i\times C_i$.

9. The method as claimed in claim 2, further comprising:

generating the energy feature curve according to an energy feature of the audio signal to be detected, and generating the spectrum feature curve according to a spectrum feature of the audio signal to be detected.

10. The method as claimed in claim 1, further comprising:

performing structure detection on dance music to generate a plurality of structural segments of the dance music, the plurality of structural segments comprising at least one of an audio intro segment, an audio verse segment, an audio chorus segment and an audio outro segment; and for each structural segment, generating the audio feature curve according to the audio signal.

11. The method as claimed in claim 10, further comprising:

for structural segments of the same structure in the plurality of structural segments, performing alignment correction on detected rhythm point information according to an alignment algorithm.

12. The method as claimed in claim 1, wherein determining the music style of the audio signal to be detected comprises:

inputting the audio signal to be detected to a pre-trained neural network model with a music style determination function, and determining the music style of the audio signal to be detected through the neural network model.

13. The method as claimed in claim 12, further comprising:

acquiring music sample data with a music style label, and inputting the music sample data to a learning classification model to train the learning classification model to generate the neural network model with the music style determination function.

14. The method as claimed in claim 12, wherein the audio signal to be detected is dance music for dance arrangement, and the audio signal to be detected comprises a plurality of continuous frame sequences.

15. The method as claimed in claim 12, further comprising:

taking the neural network model as a music style classifier to determine a music style of dance music.

16. The method as claimed in claim 12, wherein the neural network model is trained through music sample data with a music style label, and the neural network model comprises a learning classification model.

17. The method as claimed in claim 1, wherein the audio feature curve is a curve comprising an audio feature of the audio signal to be detected.

18. The method as claimed in claim 1, wherein the rhythm point is a position where a crest of the audio feature curve suddenly appears.

19. An electronic device, comprising a memory, a processor and a computer program stored in the memory and capable of running in the processor, the processor executing the computer program to implement the following steps:

acquiring an audio signal to be detected, and generating an audio feature curve according to the audio signal to be detected;

determining a music style of the audio signal to be detected;

determining a detection peak threshold and a detection frame width threshold according to the music style of the audio signal to be detected; and determining a rhythm point of the audio feature curve according to the detection peak threshold and the detection frame width threshold.

20. A non-transitory computer-readable storage medium, in which a computer program is stored, the computer program being operated by a processor to execute the following steps:

acquiring an audio signal to be detected, and generating an audio feature curve according to the audio signal to be detected;

determining a music style of the audio signal to be detected;

determining a detection peak threshold and a detection frame width threshold according to the music style of the audio signal to be detected; and determining a rhythm point of the audio feature curve according to the detection peak threshold and the detection frame width threshold.

* * * * *